United States Patent [19]
Weissmann

[11] Patent Number: 6,044,435
[45] Date of Patent: *Mar. 28, 2000

[54] METHOD FOR DETERMINING ALLOCATABILITY OF TAPE DRIVES TO SERVE REQUESTS TO STORE INFORMATION

[75] Inventor: Paul Thomas Weissmann, Morrison, Colo.

[73] Assignee: Storage Technology Corporation, Louisville, Colo.

[21] Appl. No.: 08/900,460

[22] Filed: Jul. 25, 1997

[51] Int. Cl.[7] ....................................................... G06F 12/00
[52] U.S. Cl. ............................................. 711/111; 711/105
[58] Field of Search ................................... 711/111, 105; 395/444, 620; 414/277; 364/30, 34, 36

[56] References Cited

U.S. PATENT DOCUMENTS

| | | | |
|---|---|---|---|
| 4,769,782 | 9/1988 | Iwanaga . | |
| 4,932,826 | 6/1990 | Moy et al. | 414/277 |
| 5,386,545 | 1/1995 | Gombos, Jr. et al. | 395/620 |
| 5,491,810 | 2/1996 | Allen | 395/444 |
| 5,530,897 | 6/1996 | Meritt | 395/829 |
| 5,557,528 | 9/1996 | Munro et al. . | |
| 5,745,913 | 4/1998 | Pattin et al. | 711/105 |

*Primary Examiner*—Majid A. Banankhah
*Assistant Examiner*—Nasser Moazzami
*Attorney, Agent, or Firm*—Duft, Graziano & Forest

[57] ABSTRACT

The present invention is a method for testing if modifications made to the lists of tape drives available to serve requests in a modified request queue allow n different tape drives to be assigned to n requests. The three embodiments of the present invention each test the modified lists in a manner that determines, not only if the number of tape drives assigned is sufficient to serve the number of requests, but whether the tape drives are assigned in a way that allows n different tape drives to serve n requests.

19 Claims, 11 Drawing Sheets

METHOD FOR DETERMINING ALLOCATABILITY OF TAPE DRIVES TO SERVE REQUESTS TO STORE INFORMATION

CROSS REFERENCES

This application is a continuing prosecution application of application number 08/900,460 filed upon Jul. 25, 1997. The above mention application is hereby expressly incorporated by reference as if set forth below.

FIELD OF THE INVENTION

The present invention relates to the modifying of lists of identities of tape drives available to serve requests from processors connected to a memory management system. More particularly, the present invention relates to a method of testing to determine if the tape drives can be selected from the modified lists so that a different tape drive concurrently serves each request.

PROBLEM

A memory management system includes a memory controller and a plurality of tape drives. At least one processor is connected to the memory management system. Each connected processor may transmit a request for a tape drive to the memory management system when the processor needs to write information to a tape or read information from a tape. The memory controller receives each request and generates a request queue. The request queue contains the identity of the possessor making the request, the type of request, and a list of the identities of tape drives that the memory controller has assigned to be available to serve each request. The tape drives are assigned to the lists in a manner that allows tape drives to concurrently serve each request. The memory controller then schedules all of the requests from the various processors using the generated lists of identities of tape drives available to serve the requests in the request queue and the read and write operation are performed.

Sometimes a particular request must be served by a particular tape drive or group of tape drives. One reason that a particular group of tape drives must serve a particular request is that the data being written by the request is only stored in the particular tape drive. A second reason for a particular tape drive or group of tape drives to serve a particular request is that a request may need to read or write data from a tape that has a higher recording density to hold larger amounts of data on a single cartridge. A third reason is that a particular request may require a tape drive that can read a certain medium, for example, CD-ROM. In order to assure the memory controller assigns the particular tape drive to serve the particular request, an application modifies the list of identities of tape drives available to serve the particular request in the request queue. Sometimes the application must modify more than one of the lists tape drive identities, since more than one request must be served by a certain tape drive. The particular tape drives may be needed to serve particular requests because a certain type of information is stored in these tape drives. Another example of when modified lists are needed is when tape drives are added or subtracted from the memory management system.

It is a problem that sometimes the memory controller cannot schedule a different tape drive to concurrently serve each request using the modified lists of tape drive identities in the modified request queue. This causes a request to fail, which means the write operation is not completed and data is lost. The possibility of a request failing from the use of the modified request queue to schedule the requests must be detected. If a possibility of failure is detected, the modified request queue cannot be used to schedule the requests and the original request queue must be used by the memory controller to schedule the requests. Since it is known that a different tape drive can be selected to concurrently serve each request from the lists of tape drive identities in the original request queue, the use of the original request queue does not cause a request to fail.

In the prior art, the possibility of a request failing if the modified request queue is used to assign the tape drives to serve the requests was determined by a counting method. The requests in the request queue are counted and the number of available tape drives to serve the requests are counted. If the number of requests is greater than the number of available tape drives, a request may fail if the modified request queue is used to schedule the requests. This former method determines the probability of failure in most normal situations. However, it is not accurate in all situations.

The following is an example of when the former method would not detect a failure. A modified request queue contains lists of tape drives that contain n tape drives that are available to serve n requests and m of the n requests can only be served by x tape drives, where m is greater than x. The number of requests and the number tape drives are equal in this example and the former method indicates that the use of the modified request queue will not cause a request to fail. However, m requests cannot be concurrently served by x tape drives, because m is greater than x. Therefore, the use of the modified request queue will cause a failure. In this case, the modified request queue cannot be used to schedule the requests, since a failure will occur. If there are a small number of requests and tape drives, simple comparisons can be used to determine whether each request can be concurrently served by a different request. As the number of requests grows, fast and efficient determinations are needed to detect the possibility of the modified request queue causing a failure. Therefore, there is a need for improving failure detection methods.

SOLUTION

The above and other problems are solved by the methods of the present invention. An original request queue is generated by a memory controller as requests are received by a memory management system. The request queue contains the identity of each request and a list of identities of tape drives available to serve each request. In order to make the memory controller select a particular tape drive to serve a particular request, an application reads the original request queue and generates a modified request queue that contains at least one list of identities of tape drives available to serve a request. The present invention determines if the memory controller can select a different tape drive to serve each request from the list of tape drive identities in the modified request queue. If the memory controller cannot use of the modified request queue to assign a different tape drive to serve each request, the present invention returns a flag indicating that modified request queue cannot be used to schedule the requests by the memory controller. The present invention is three methods that can test the possible use of the modified request queue to assign the tape drives to the requests.

A first embodiment is a counting test. In order to determine if each request can be served by a different tape drive, the first embodiment generates all the possible subsets of requests in the modified request queue. The number of requests and the number of different tape drives identified in the request queue as available to serve the requests in each subset are counted and compared. If the number of tape drives is greater than or equal to the number of requests in each subset, the memory controller can schedule a different tape to concurrently serve each request from the lists in the modified request queue. The testing of the subset tests the relationship between the lists of tape drives available to serve each request. If one subset has a greater number of requests than the number of tape drives, there is a certainty that the tape drives can be scheduled to serve the requests in a manner that would not allow at least one request to be served concurrently.

A second embodiment uses a minimal use assignment method to determine whether a different tape drive is available to serve each request. Each tape drive is assigned to a request. The assignment of a tape drive to a request is determined by finding the tape drive, identified in the modified request queue, that is available to serve the least number of requests. This tape drive is assigned to one of the requests that the tape drive is available to serve. The assigned request is the request from the group of requests that the selected tape drive can serve with the fewest tape drives available to serve the request. Once a tape drive is assigned to a request, the tape drive and the request cannot be assigned to another tape drive or request. In order to exclude the request, the number of requests that each tape drive is available to serve must be recounted excluding the assigned request and the process is repeated either until all of the requests have been assigned to a tape drive or there are no more tape drives available to serve the remaining requests. If a different tape drive is assigned to serve each request, then the modified request queue can be used by the memory controller to assign a different tape drive to concurrently serve each request.

A third embodiment generates groups of the tape drives that are available to serve the same set of requests. The premise of the third embodiment is that if the number of different tape drives in a group of tape drives that are available to serve a set of requests is greater than or equal to the number of requests in the set to be served, each request will be served by a different tape drive. The number of tape drives in each group and the number of requests in the set that each group of tape drives is available to serve are counted. If the number of tape drives in the group is greater than or equal to the number of requests that the tape drive group is available to serve, each request served by the group can be served by a different tape drive. If all of the requests are served by at least one group and each group has a greater number of tape drives than the number of requests to serve, a different tape drive is available to serve each request and the modified request queue can be used by the memory controller to schedule the requests. Otherwise, a different method must be used to determine if each request that is not served by a tape drive group can be served by a different one of the remaining tape drives.

The present invention is a quick and reliable method to test if a modified request queue can be used to assign tape drives to concurrently serve each request. The present invention tests the assignment of tape drives available to serve the different requests. By testing the assignment of the tape drives in the modified queue, the present invention eliminates the possibility that a modified request queue that can cause a request to fail will be used to schedule the requests.

DETAILED DESCRIPTION

Figure 1:
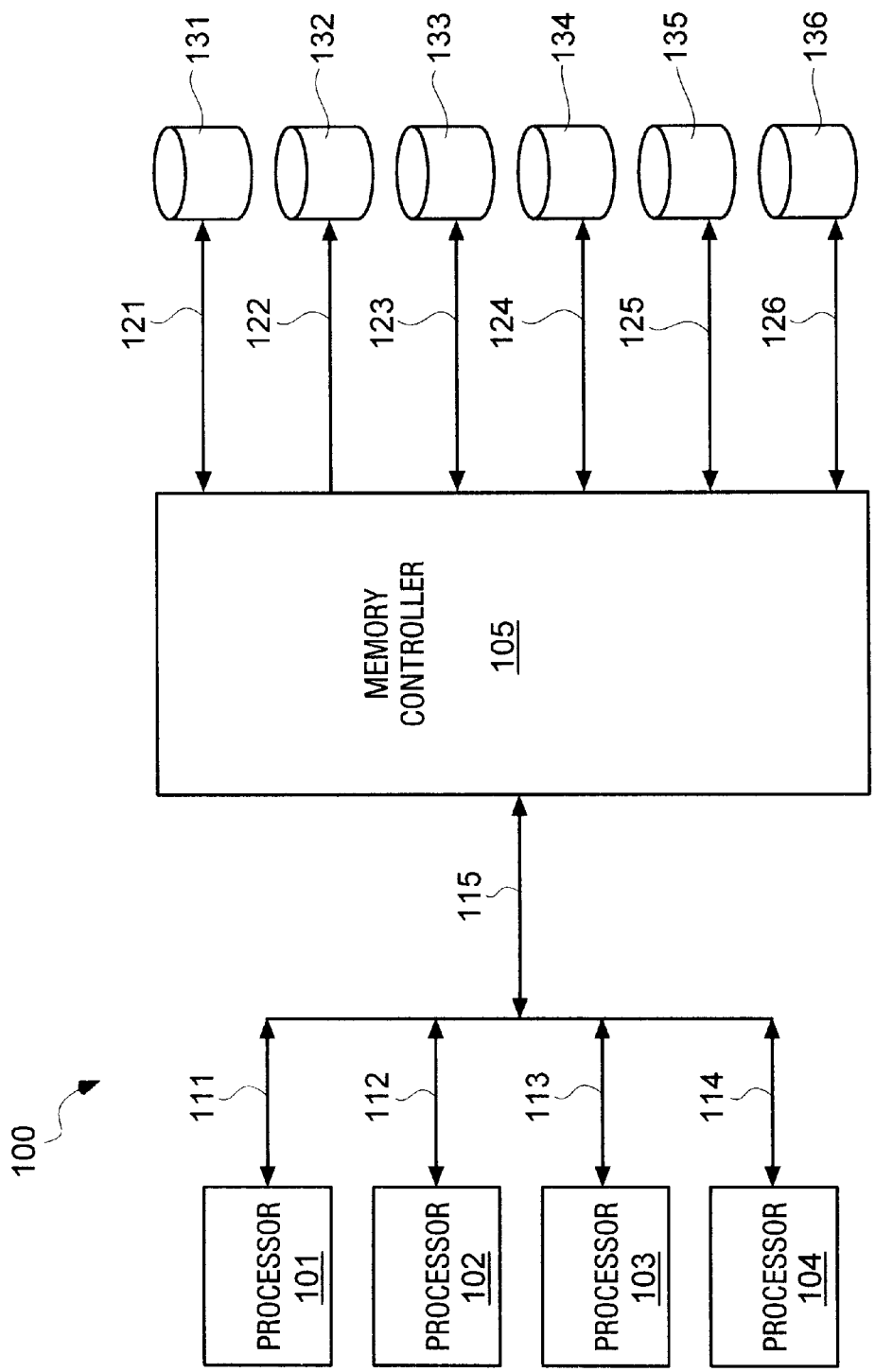
FIG. 1 illustrates a block diagram of a memory management system.

FIG. 1 illustrates memory management system 100. Connected processors 101–104 transmit data to memory controller 105 via buses 111–115. Information may be written to and read from memory management system 100 over buses 111 and 115 by processor 101. The other connected processors may similarly read from and write to memory management system 100. Memory controller 105 is the interface between connected processor 101–105 and back end tape drives 131–136. All read and write operations from the connected processors to the tape drives are scheduled by memory controller 105. Tape drives 131–136 are connected to memory controller 105 by buses 121–126 to allow the memory controller to perform read and write operations to the individual tape drives.

Figure 2:
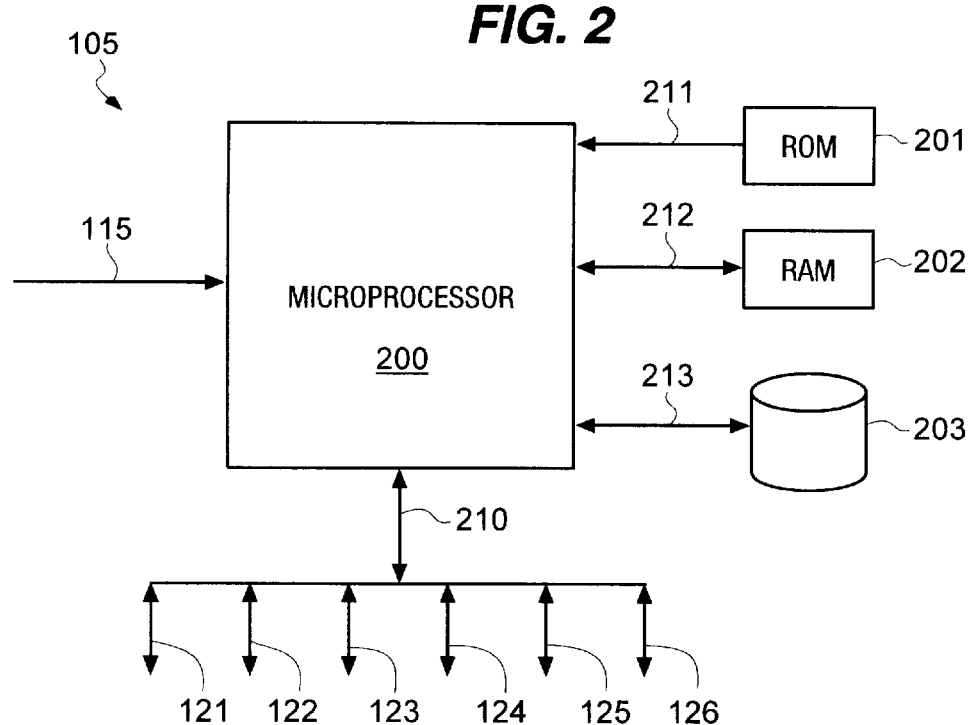
FIG. 2 illustrates a block diagram of a memory controller of the memory management unit.

FIG. 2 illustrates a block diagram of the components of memory controller 105. Memory controller 105 contains microprocessor 200 which is able to execute instructions stored in memory. The instructions for controlling memory management system 100 are read from Read Only Memory (ROM) 201 via bus 211. Information needed to execute the instructions is read from and written to Random Access Memory (RAM) 202 via bus 212. Bus 213 connects microprocessor 200 to volatile memory 203, which is used to store information received from connected processors 101–104 or tape drives 120–125 and to store instructions for additional processes executed by microprocessor 200. Bus 210 connects microprocessor 200 to I/O buses 121–126 to allow the microprocessor to read and write information to tape drives 131–136. Microprocessor 200 reads and writes information to and from connected processors 101–104 via bus 115.

Memory controller 105 schedules all operations between connected processor 101–104 and tape drives 130–135 (FIG. 1). If the request connected processor 101 is for a read operation, the instructions in ROM memory 201 instruct microprocessor 200 to generate a read request data structure 350 illustrated in FIG. 3. Read request data structure includes an identification of the connected processor (101) requesting the read operation in identification 351, the read operator requested identification 352 and a list 304 of the identities of tape drives available to serve the read request. Read request data structure is then added to request queue 300, which is stored in RAM 202 via bus 212.

Figure 3:
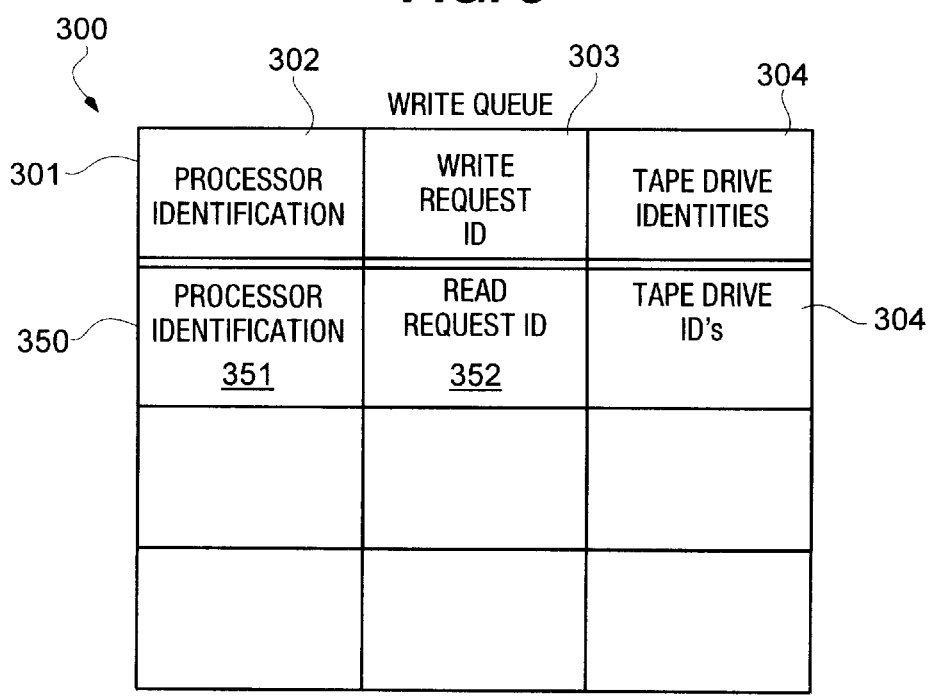
FIG. 3 illustrates a block diagram of a request queue.

If the request by connected processor 101 is for a write operation, the instructions stored in ROM memory 201 instruct microprocessor 200 to generate a request data structure 301 illustrated in FIG. 3. Write operation data structure 301 includes the identification of the connected processor (101) requesting the write operation in identification 302, the write operation requested identification 303, and a list or array 304 containing the identities of tape drives 131–136 that are available to serve the request. The request data structure 301 is added to a request queue 300, which is a linked-list, an array, or the equivalent data structure. The request queue is then written to RAM memory 202 via bus 212 or to volatile memory 203 via bus 213.

Request queue 300 is used by microprocessor 200 to generate a schedule of read and write events to be completed. To schedule the events, microprocessor 200 executes instructions read from ROM memory 201. These instructions include a method for determining a particular tape drive 131 from tape drives 131–136 to concurrently serve each request by performing the read or write operation for a connected processor 101. The lists 304 of tape drive identities are generated in a manner that ensures the scheduling method is able to select a different tape drive to serve each request. If each request cannot be assigned a different tape drive, one of the requests cannot be concurrently served and the data being written by the request is lost, which is a request failure. A proper tape is retrieved and placed in the assigned tape drive and the operation is performed.

Some applications stored in ROM memory 201, volatile memory 203, or a connected processor 101 have instructions requiring a particular tape drive or group of tape drives serve a particular request. Some reasons for a particular tape drive serving a particular request include but are not limited to storing particular types of information on a particular tape drive, and preventing an assignment of a damaged tape drive. The applications modify list 304 of tape drive identities in request queue 300 in order to have microprocessor 200 schedule a particular tape drive or one of a particular group of tape drives to serve particular requests. The modification of at least one list 304 creates a modified request queue 300 and can cause one of the requests to fail, because it may no longer be possible for microprocessor 200 to assign a different tape drive to serve each request from the modified queue. To avoid failures, the present invention is used to determine if a different tape drive can be assigned to serve each request from lists 304 in the modified request queue. If each request can be served by a different tape drive, the modified request queue is used to schedule the requests. Otherwise the original request queue is used to schedule the tape drives to serve the requests.

Figure 4:
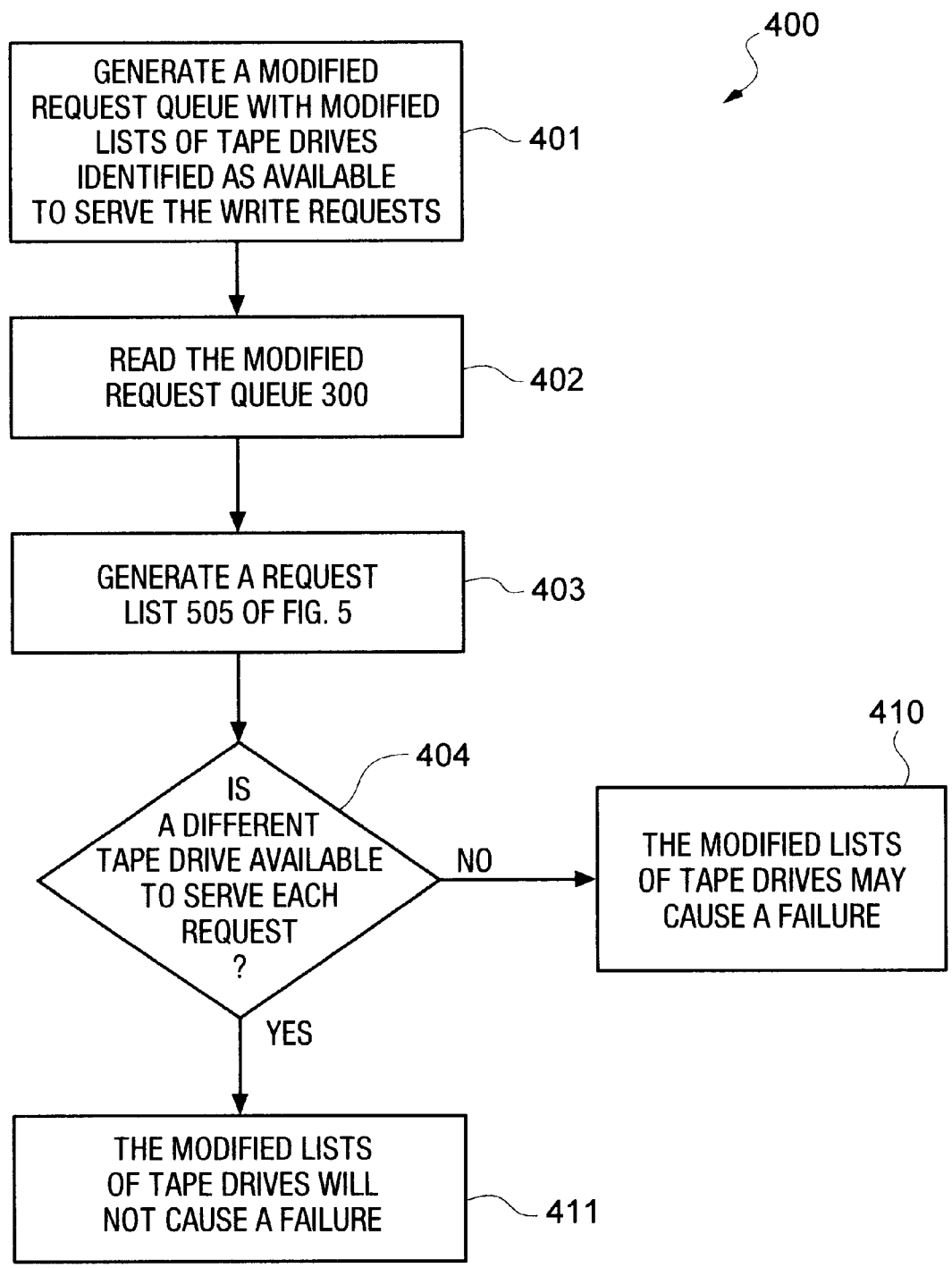
FIG. 4 illustrates a flow chart of the instructions for a modification of a write operation in the scheduling information of the memory management system.

FIG. 4 illustrates a flow chart of the instructions microprocessor 200 reads from ROM memory 201, or volatile memory 203 for modifying the lists 304 of tape drives available to serve requests in request queue 300. In step 401, an application generates a modified request queue with modified lists 304 of tape drives identified as available to serve the requests in order to have a particular tape drive or group of tape drives serve a particular request. The modified request queue 300 is written to memory. In step 402, a testing routine provides instructions to microprocessor 200 to read the modified request queue generated in step 401, so that the modified request queue 300 can be tested. Microprocessor 200 then generates a request list from the modified request queue in step 403 in order to readily access the information stored in the modified request queue.

Figure 5:
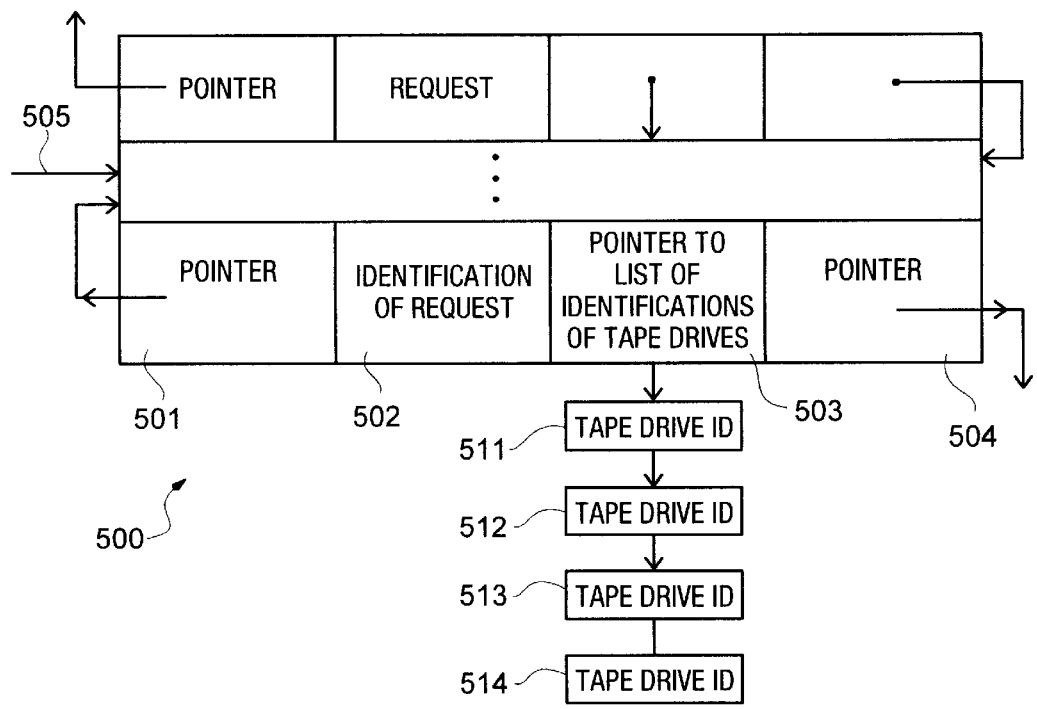
FIG. 5 illustrates a block diagram the data structure of a request list.

The request list generated in the preferred embodiment of step 403 is a double linked list of data structures. FIG. 5 illustrates a block diagram of the request list 505. Data structure 500 of request list 505 has forward pointer 501, which points to the previous data structure on the linked list. An identity of the request represented by data structure 500 is stored in identification 502. List pointer 503 is a linked list of tape drive identities 511–514 available to serve the identified request. Pointer 504 contains a pointer to the next data structure in request list 505.

Process 400 continues on FIG. 4 with step 404 using request list 505 to determine if a different tape drive is available to concurrently serve each request in the lists of tape drive identities in modified request queue 300. If a different tape drive is not available to concurrently serve each request, step 410 returns a flag indicating that the modified lists of tape drive identities may cause a request failure if used for scheduling and modified request queue 300 should not be used by microprocessor 200 for scheduling of the requests. If a different tape drive can be assigned to concurrently serve each request, step 411 returns a flag that indicates the modified lists will not cause a failure and the modified request queue 300 is used by microprocessor 200 for scheduling the requests. Microprocessor 200 reads the flag returned by process 400 and determines if the modified request queue or the original request queue is to be used from the scheduling. If modified request queue 300 is to be used, the modified request queue is stored to RAM memory 202 for use in the scheduling of all read and write operations.

Step 404 has three embodiments in the present invention. A first embodiment determines if a different tape drive is available to serve each request by generating all possible subsets of requests and determining if each subset has a number of tape drives available to serve the requests in the subset that is greater than or equal to the number of requests in the subset. If the number of tape drives available to serve the requests in each subset is greater than or equal to the number of requests in the subset, a different tape drive is available to serve each request in the set of requests and the modified request queue is used to schedule the requests. Otherwise, a different tape drive may not be available to serve each request and the modified request queue 300 is not used for scheduling of the write operations. A second embodiment uses a method of assigning the tape drive available to serve the least number of requests to the request that the tape drive is available to serve which has the least number of tape drives available to serve the request. If all of the requests can be assigned to a tape drive, then a different tape drive is available to serve each request and the modified request queue 300 can be used to schedule the write operations. A third embodiment groups the tape drives that are available to serve the same requests. A group of tape drives is a set of tape drives such that if a request has any member of the group available, it has all members of the group available to serve the request. The group is the maximal set of tape drives with these characteristics. For each group it is then determined if the number of tape drives in the group is greater than or equal to the number of requests that the group is available to serve. If the number of tape drives in each group is greater than or equal to the number of requests that the group is available to serve, a different tape drive is available to serve each request. Otherwise, a determination must be made to decide if another method must be used to determine whether or not the remaining requests that are not served by a group can be concurrently served by different tape drives.

Figure 7:
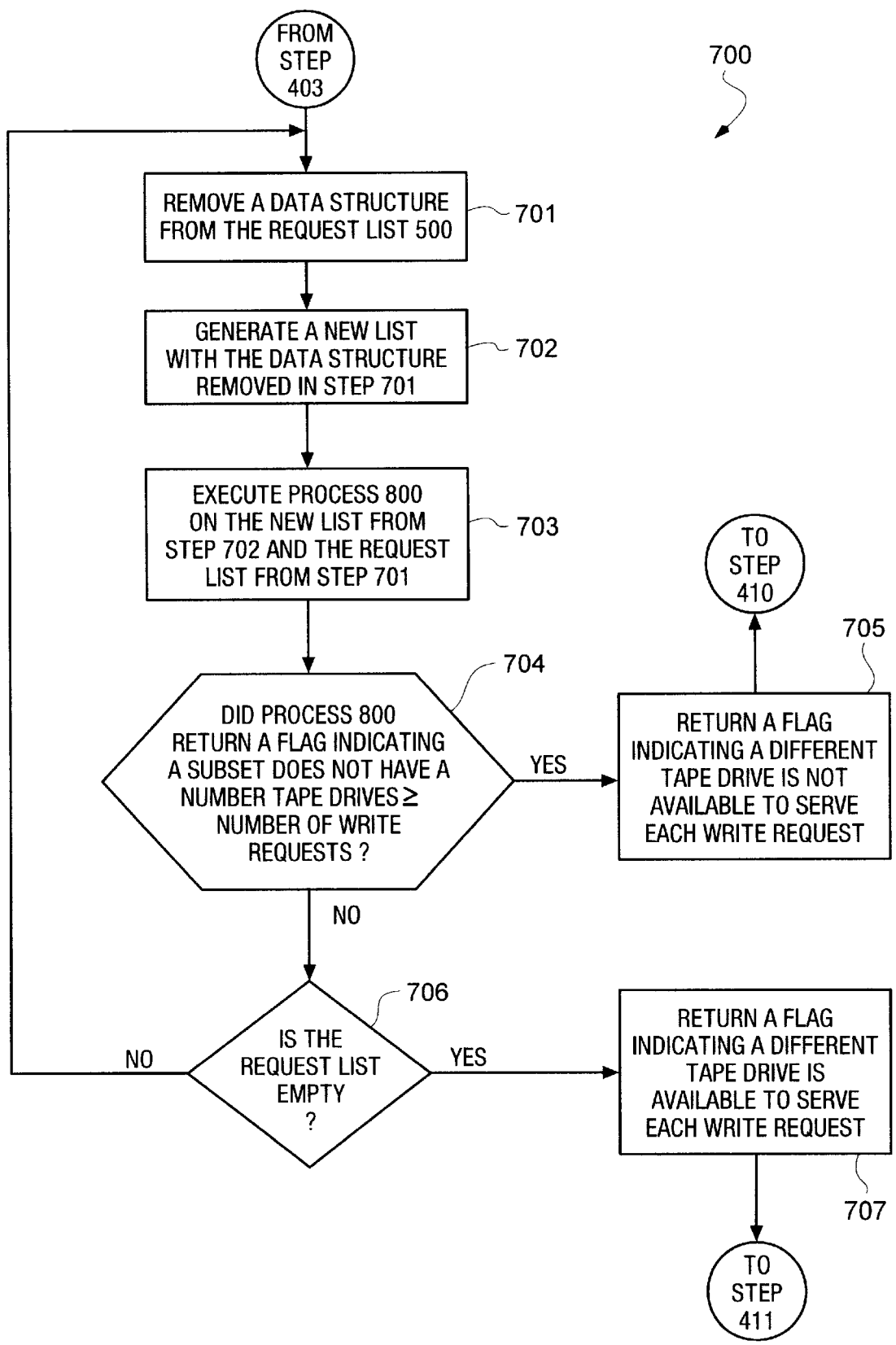
FIG. 7 illustrates a flow chart of a first iterative process of a first preferred embodiment of the present invention.
Figure 8:
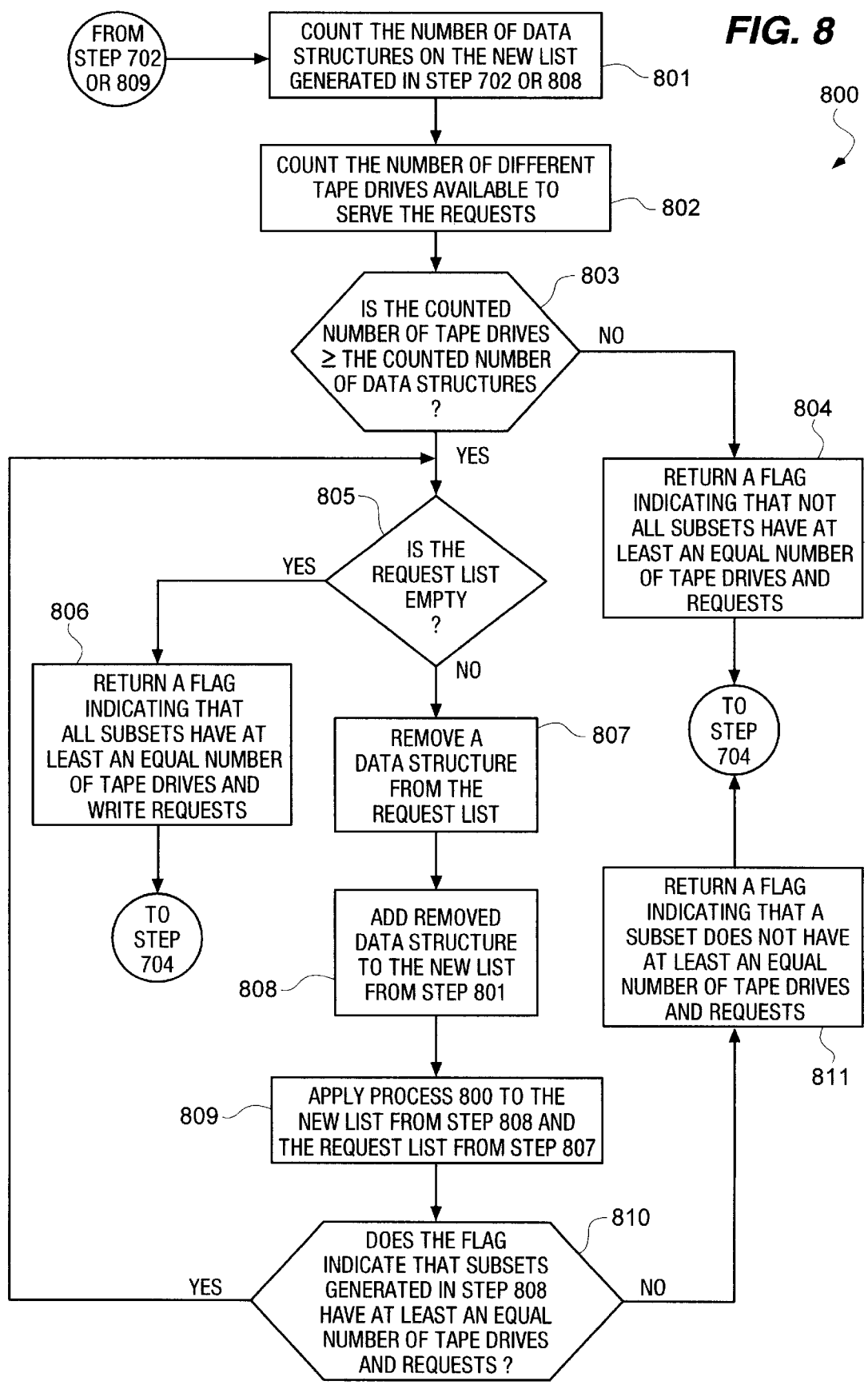
FIG. 8 illustrates a flow chart for a second iterative process of a first preferred embodiment of the present invention.

FIG. 7 illustrates the preferred first embodiment of step 404. In process 700, each subset of a set of all the requests in the modified request queue is generated. The number of requests in each subset and the number of different tape drives available to serve the requests are counted. If each subset has at least an equal number of different tape drives and requests, the set of all requests can have a different tape drive assigned to concurrently serve each request from the modified request queue. Process 700 begins with step 701 in which data structure 500 is removed from the request list 505. Step 702 generates a new list containing the data structure removed in step 701. The new list represents the subset containing the request identified in the removed data structure and the new list is used to generate all subsets containing the request identified on the removed data structure and all the requests identified in data structures remaining in request list 505. Process 800, described by FIG. 8, is executed in step 703 using the new list generated in step 702 and the remaining request list from step 701. In step 704, microprocessor 200 determines if process 800 returned a flag indicating that a subset generated by process 800 does not have a number of different tape drives available to serve each request in the subset that is greater than or equal to the number of requests in the subset. If process 800 returns a flag indicating that a subset generated does not have a number of tape drives available to serve that is greater then or equal to the number of requests in the subset, step 705 returns a flag indicating that a different tape drive is not available to serve each request. Otherwise, step 706 determines whether or not the request list is empty. If the request list is empty, step 707 returns a flag indicating a different tape drive is available to serve each request . If the request list still contains data structures, process 700 is repeated beginning with step 701.

If process 700 returns the flag of step 705, step 404 of process 400 determines there is not a different tape drive available to serve each request and step 410 returns a flag indicating that the modified request queue 300 will cause a failure and cannot be used by memory controller 105 for scheduling of the read and write operations. If process 700 returns the flag of step 707, step 404 determines the modified lists will not cause a failure and step 411 returns a flag indicating that the modified request queue 300 can be used for scheduling the requests.

The preferred embodiment of a second iterative routine is illustrated in FIG. 8. In process 800, step 801 begins by counting the number of data structures in the new list generated in step 702 or step 808. The counted number of data structures represents the number of requests in the subset represented by the new list. Step 802 counts the number of different tape drives available to serve the requests of the subset by reading the list 503 of tape drive identities in the data structures 500 on the new list and counting each different tape drive in the read lists 503.

Step 803 compares the counted number of data structures and tape drives to determine whether or not the counted number of tape drives is greater than or equal to the counted number of data structures. If the number of tape drives is less than the number of data structures, step 804 returns a flag indicating that not all subsets have at least an equal number of requests and tape drives available to serve the requests. Otherwise, step 805 determines if request list 505 is empty.

If request list 505 is empty, step 806 returns a flag indicating that all the subsets generated by process 800 have at least an equal number of tape drives and requests. If the request list contains data structures, step 807 removes a data structure from the request list. Step 808 adds the removed data structure to the new list from step 801. The adding of the data structure creates another subset and step 809 executes process 800 using the new list from step 808 and the request list remaining after the removal of a data structure 500 in step 807. The execution of process 800 creates a nested process. Any modifications of request list 505 by the nested process do not affect request list 505 used by the original process 800 that created the nested process.

Step 810 determines if the flag returned by the nested process indicates that the subsets generated by the nested process have an at least equal number of tape drives and requests. If the flag returned, by the nested process indicates that the subsets generated by the nested process have at least an equal number of tape drives and requests, process 800 is repeated from step 805. Otherwise a flag is returned by step 811 that indicates that a subset does not have at least an equal number of tape drives and requests.

The preferred first embodiment is a first and a second iterative process. The second iterative process generates all of the subsets of requests containing the request identified in the data structure removed from request list 505 by the first process. The following is an example of processes 700 and 800. The first table is an example of a request list listing requests identified and identities of the tape drives available to serve each request.

| Requests | Tape Drive Numbers |
| --- | --- |
| A | 1 |
| B | 1,2 |
| C | 1,2,3 |

The data structure 500 containing the identity of the first request, A, is removed from the request list by step 701. In step 702, a new list is formed with the data structure of request A. Step 703 executes process 800 using the new list generated in step 702 and the remaining request list. Process 800 generates the following subsets by removing data structures from the request list and adding the removed data structures to the new list. This generates all of the subsets of the set of requests containing request A.

| Requests | Distinct Tape Drives Available | # of Requests vs. # of Tape Drives Available |
| --- | --- | --- |
| A | 1 | 1,1 |
| A,B | 1,2 | 2,2 |
| A,B,C | 1,2,3 | 3,3 |
| A,C | 1,2,3 | 2,3 |

As shown in the above table, the number of tape drives available to serve requests in each subset is greater than or equal to the number of requests in the subset. Step 704 determines that process 800 returned a flag indicating that all of the subsets have a number of tape drives greater than or equal to the number of requests. Step 706 determines that the request list contains the data structures of requests B and C. Therefore, process 700 is repeated and data structure containing request B is removed from the request list. A new list is formed containing the data structure containing the identity of request B. Process 800 generates and tests all of the subsets containing request B.

| Request Group | Tape Drives available to serve the Request Group | # of Requests vs. # of Tape Drives Available |
| --- | --- | --- |
| B | 1,2 | 1,2 |
| B,C | 1,2,3 | 2,3 |

Process 800 returns a flag indicating that all subsets containing request B have been tested and have at least an equal number of different tape drives available to serve and requests. Process 700 is then repeated and the data structure containing request C is removed from the request list. Process 800 is executed to generate and test all the remaining request groups containing request C. Steps 801 and 802 count the number of data structures (1) and number of tape drives available to serve the request (3) on the new list. Since the number of tape drives is greater than the number of requests step 803 goes to step 805. In step 805, it is determined that the request list is empty, and step 806 returns a flag indicating that all the subsets generated by process 800 containing request C have at least an equal number of tape drives available to serve as requests. Process 700 reads the flag return returned by process 800 in step 704 and goes to step 706 which determines the request list is empty. Since the request list is empty, step 707 returns a flag indicating that each subset has a different tape drive available to serve each request. Therefore process 400 returns a flag indicating modified request queue 300 is to be used for the scheduling of the requests.

| Request Group | Tape Drives available to serve the Request Group | # of Requests vs. # of Tape Drives Available |
|---|---|---|
| C | 1,2,3 | 1,3 |

The above example shows how the first embodiment of the present invention tests all possible subsets of the set of requests. The first embodiment is a reliable method of testing to determine if a different tape drive is available to serve each request. By testing each subset, every possible combination of requests is tested to determine if each requesting the combination can be served by a different tape drive. If each request of a combination of requests cannot be served by a different tape drive, there is a possibility of a failure. The first embodiment detects this possibility of a failure and does not allow the modified request queue 300 to be used. The generation of the subsets including at least one request requires on the order of $2^n$ steps, and can be time consuming as the number of requests increases.

Figure 9A:
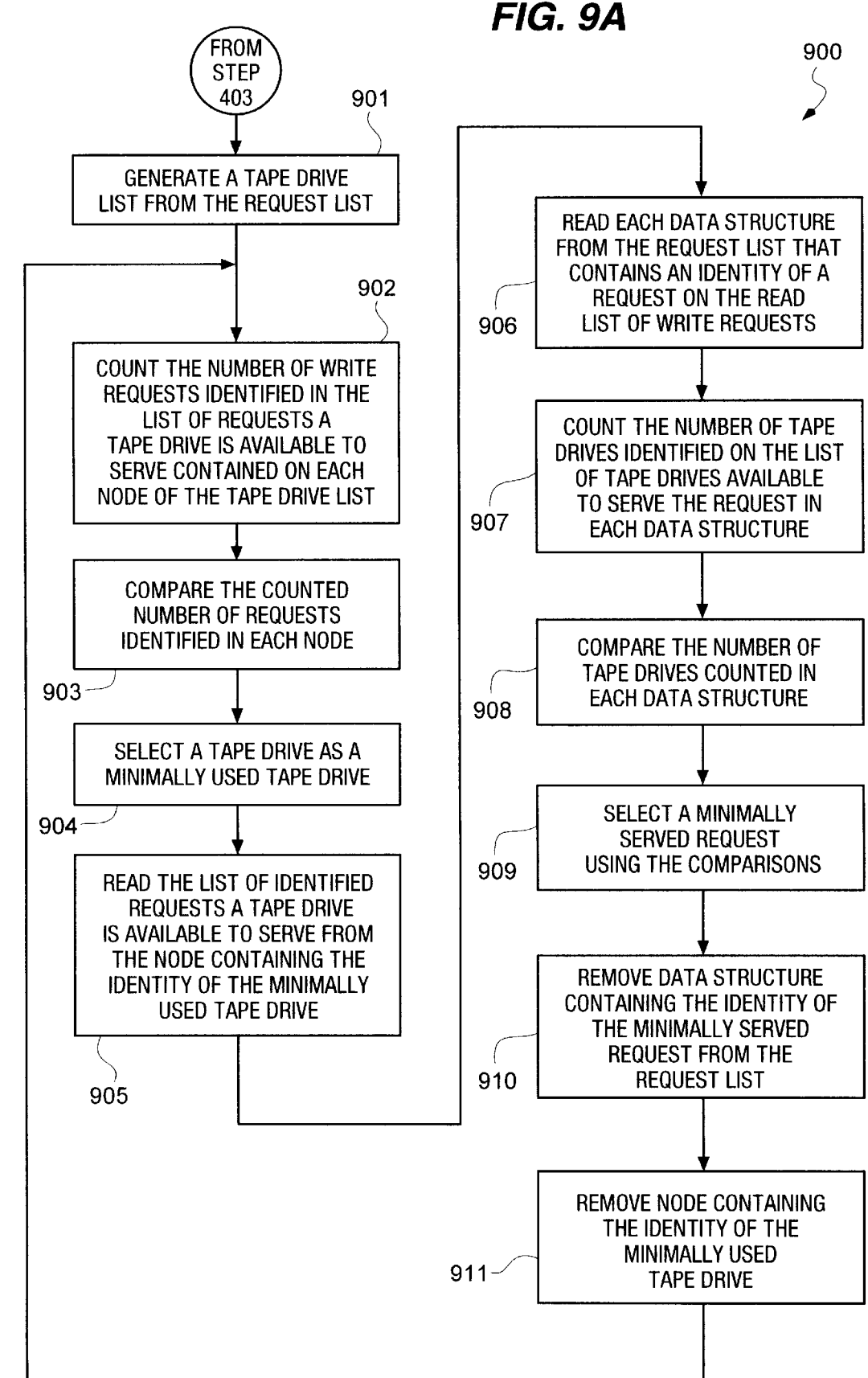
FIGS. 9A–9B illustrates a flow chart of a second preferred embodiment.
Figure 9B:
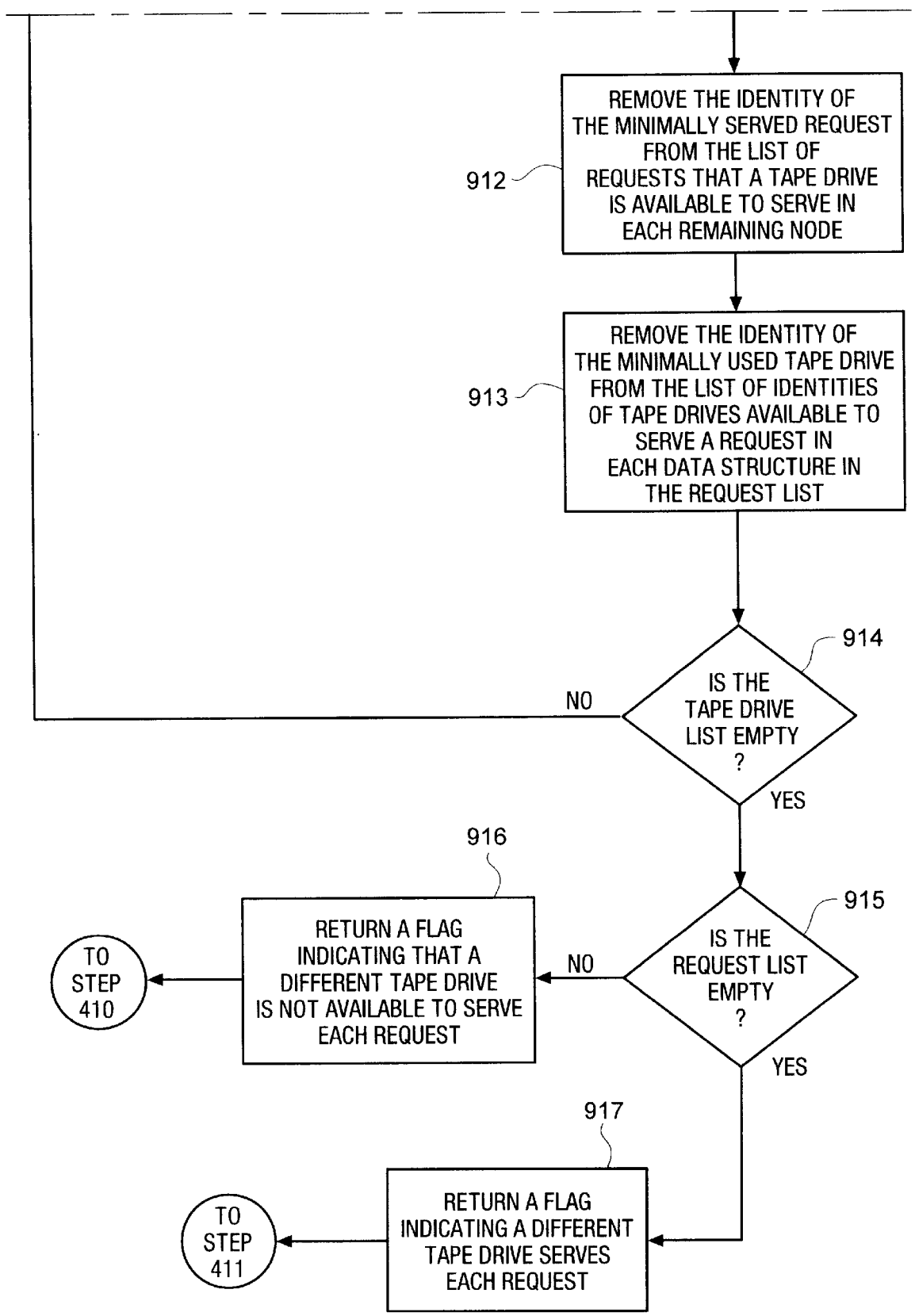

A preferred second embodiment of invention assigns a different tape to each request by a minimal use assignment method. If all of the requests can be assigned to a different tape drive, each request can be concurrently served by a different tape drive. FIG. 9 illustrates a flow chart of the preferred second embodiment, which assigns a minimally used tape drive to a minimally served request. A minimally used tape drive is the tape drive that is available to serve the fewest number of requests and the minimally served request is the request with the fewest number of tape drives available to serve that request.

Figure 6:
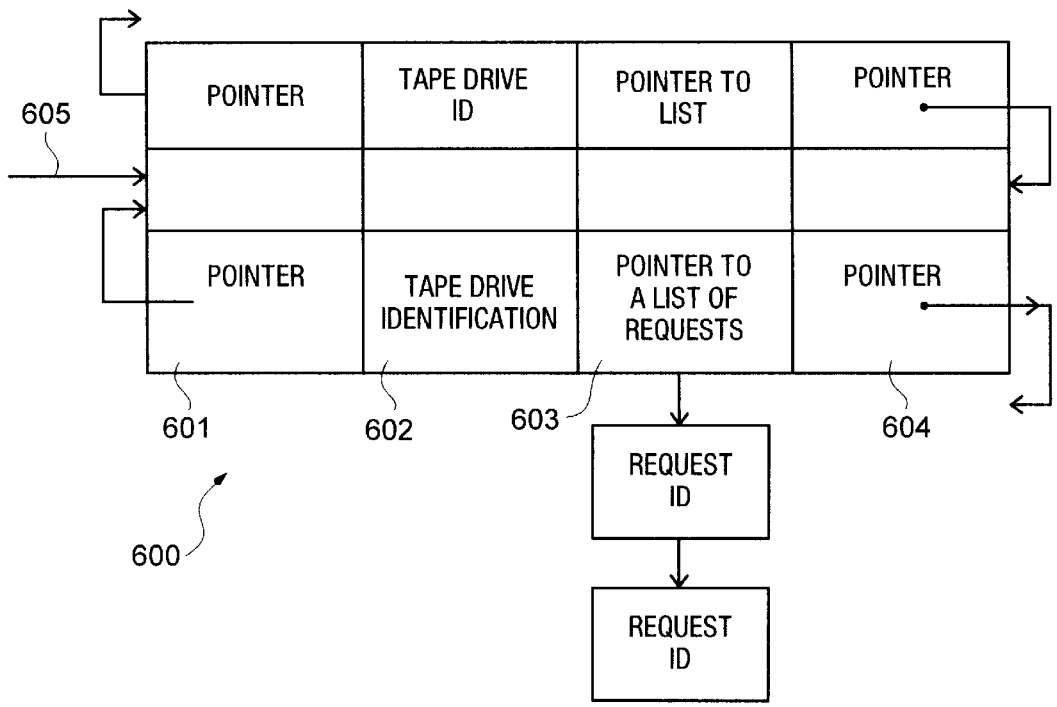
FIG. 6 illustrates the data structure of a tape drive list.

Process 900 begins with step 901 generating a tape drive list 605 (FIG. 6) from the information in request list 505. Tape drive list 605 provides an easy method to read information pertaining to the individual tape drives. The data structure of tape drive list 605 is illustrated in FIG. 6. Forward pointer 601 indicates a node preceding node 600 on the tape drive list 605. The identity of the tape drive is stored in tape drive identification 602. List 603 is a linked-list of identities of the requests 610–613 that the identified tape drive is available to serve. The next node on the list is pointed to by backward pointer 604.

After the tape drive list is generated, FIG. 9 illustrates the remainder of process 900. Step 902 has microprocessor 200 count the number of requests identified in the list 603 of request identities in each node 600 of tape drive list 605. Step 903 compares the counted numbers of requests identified in each node 600. This number represents the number of requests that the tape drive identified in the node is available to serve. Using the comparisons, step 904 has microprocessor 200 select the node 600 containing the identity of a minimally requested tape drive, which is the tape drive identified in the node 600 with the fewest number of requests.

Figure 10:
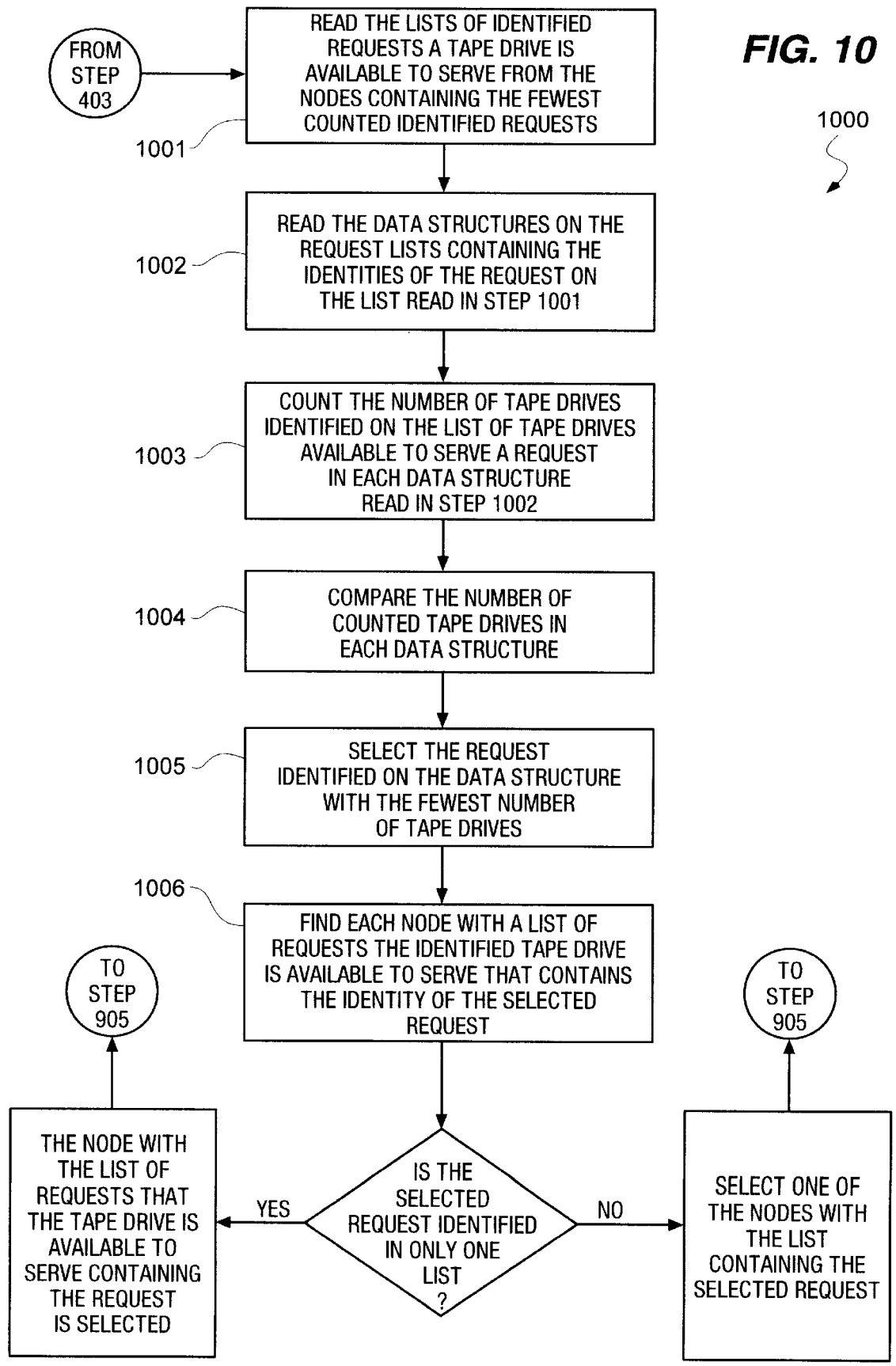
FIG. 10 illustrates a flow chart of a selection method used in the second preferred embodiment.

If the fewest number of requests is contained in more than one of the nodes, the preferred embodiment executes process 1000, illustrated in FIG. 10, to select the minimally used tape drive. Process 1000 begins with step 1001 which reads the list 603 of request identities in each of the more than one nodes containing the fewest counted identified requests. In step 1002, microprocessor 200 reads the data structures 500 in request list 505 containing the identities of requests in the lists 603 read in step 1001. The data structures are used to quickly find information about each request. Step 1003 counts the number of tape drives identified on the list 503 of tape drive identities in each data structure 500 read in step 1002. The counting of tape drives determines the number of tape drives available to serve each request. Microprocessor 200 compares the number of counted tape drives of each data structure 500 in step 1004. From the comparisons, step 1005 selects the request identified in the data structure 500 with the fewest number of tape drives. Responsive to the selection of a request, step 1006 finds each node 600 with a list 603 of request identities containing the identity of the request in selected data structure 500.

Step 1007 determines if the selected request is identified in only one list 603. If only one node 600 has a list 603 containing the identity of the selected request, the node with the list 603 of request identities containing the identity of the selected request is selected in step 1008. If more than one list 603 contains the selected request, another method, such as randomly choosing a node 600, must be used to select one of the nodes 600 with the list 603 containing the selected requests as the minimally used tape drive in step 1009.

After the minimally used tape drive is selected, process 900 continues as illustrated in FIG. 9. Step 905 has microprocessor 200 read the list 603 of request identities from node 600 containing the identity of the minimally used tape drive selected in step 904. After list 603 is read in step 905, step 906 reads each data structure 500 from request list 505 that contains an identity of a request read from the list 603 of request identities. Microprocessor 200 counts the number of tape drives identified on the list 503 of tape drive identities in each data structure 500 in step 908. The counting determines the number of tape drives available to serve each request that the minimally used tape drive is available to serve. From the comparisons in step 908, step 909 selects a minimally served request, which is the request with the fewest number of tape drives available to serve the request.

Step 910 removes the data structure 500 containing the identity of the minimally served request from the request list 505. In step 911, microprocessor 200 removes the node 600 containing the identity of the minimally used tape drive from the tape drive list 605. After data structure 500 and node 600 are removed from request list 505 and tape drive list 605, step 912 removes the identity of the minimally served request from the list 603 of request identities in each node 600 remaining in tape drive list 605 and step 913 removes the identity of the minimally used tape drives from the lists 503 of identities of tape drives available to serve each request in the data structures 500 remaining in request list 505.

After the removals are completed, step 914 tests to determine if tape drive list 605 is empty. If tape drive list 605 is not empty, process 900 is repeated beginning with step 902. If tape drive list 605 is empty, all of the tape drives have been assigned and step 915 tests to determine if request list 505 is empty. Responsive to request list 505 being empty, step 917 returns a flag indicating a different tape drive is available to serve each request. The flag from step 917 is used by step 404 on FIG. 4 to determine that step 411 must be executed and a flag is returned indicating modified request queue 300 can be used for scheduling. Otherwise, step 916 returns a flag indicating that a different tape drive is not available to serve each request and step 404 reads the flag and determines that the flag of step 410 should be returned in process 400 and the modified request queue 300 should not be used for the scheduling of the read and write operations.

The following example shows the second embodiment executed using a set of requests where there is not a different tape drive available to serve each request. The following first table shows five requests in the request list with the list of identities of tape drives available to serve the request. Step 901 would generate a tape drive list 605 similar to the second table.

| Request Identification | Tape Drives Available to Serve the Request |
|---|---|
| A | 1,2 |
| B | 1,2 |
| C | 1,3 |
| D | 1,2,3 |
| E | 1,2,3,4,5 |

| Tape Drive Identification | Requests that Tape Drive Can Serve | Number of Requests that the Tape Drive Can Serve |
|---|---|---|
| 1 | A,B,C,D,E | 5 |
| 2 | A,B,D,E | 4 |
| 3 | C,D,E | 3 |
| 4 | E | 1 |
| 5 | E | 1 |

Step 902 counts the numbers of requests on each list 603 of request identities contained in each node 600, the results of the counting are shown in the third column of the second table. Since both tape drive 4 and tape drive 5 are available to serve only one request, step 904 must use process 1000 to select a minimally used tape drive. The list 603 of requests identities of the nodes containing the identities of tape drives 4 and 5 are read in step 1001. Step 1002 finds the data structures 500 containing the identified requests, which is the data structure 500 containing request E. Step 1003 counts the number of tape drives on list 503 in data structure 500 containing request E. Since the list 603 of requests for both tape drives 4 and 5 only contain request E, the comparing step of 1004 and selection step of 1005 select request E. Step 1006 finds that request E is contained in the list 603 of both nodes 600 and microprocessor 200 executes step 1009 to select tape drive 4 as the minimally used tape drive.

Steps 905–908 are executed and request E is selected as the minimally served request. The node 600 identifying tape drive 4 and the data structure 500 identifying request E are then removed from tape drive list 605 and request list 505 in steps 910–911. The identities of the tape drive 4 and request E are removed from lists 503 and 603 of all remaining data structures and nodes in steps 912–913. Process 900 is repeated until all of the assignments are made in the below two tables.

| Tape Drive | Request |
|---|---|
| 1 | A |
| 2 | B |
| 3 | C |
| 4 | E |
| 5 |   |

| Request | Tape Drives |
|---|---|
| A | 1 |
| B | 2 |
| C | 3 |
| D |   |
| E | 4 |

From the second table, it is apparent a request is not served. Therefore, step 915 determines microprocessor 200 will return a flag that indicates that different tape drive is not available to serve each request in step 916. Therefore, step 404 returns a flag indicating that the modified request queue 300 with the assignments from the first table of the example cannot be used to schedule the requests.

The number of steps required to make a determination in the second embodiment is on the order of the number of requests. Since the number of steps is bounded by the number of requests, the decision will be made a time considerably shorter than the first embodiment which take on the order of $2^n$. For example, process 900 was repeated 5 times to determine a different tape drive was not available to serve each request in the above example. The first embodiment must use on the order of 32 steps to make a determination about modified request queue 300 in the above example.

A third embodiment determines if the requests can be served by grouping the tape drives that are available to serve the same requests. A group of tape drives is a set of tape drives such that if a request has any member of the group available, it has all members of the group available to serve the request. The group is the maximal set of tape drives with this characteristics. If each group of tape drives has a greater or equal number of tape drives in the group than the number requests that the group of tape drives is available to serve, a different tape drive is available to serve each request that the group is available to serve. The group of tape drives and the requests that the group is available to serve do not have to be tested and the requests do have to be served by another group of tape drives. The third embodiment does not return a definitive answer for every set of tape drives and requests. However, it can reduce the number of requests and tape drives that must be passed to another algorithm, which will greatly reduce the number of steps needed for the other algorithm to make a determination.

Figure 11A:
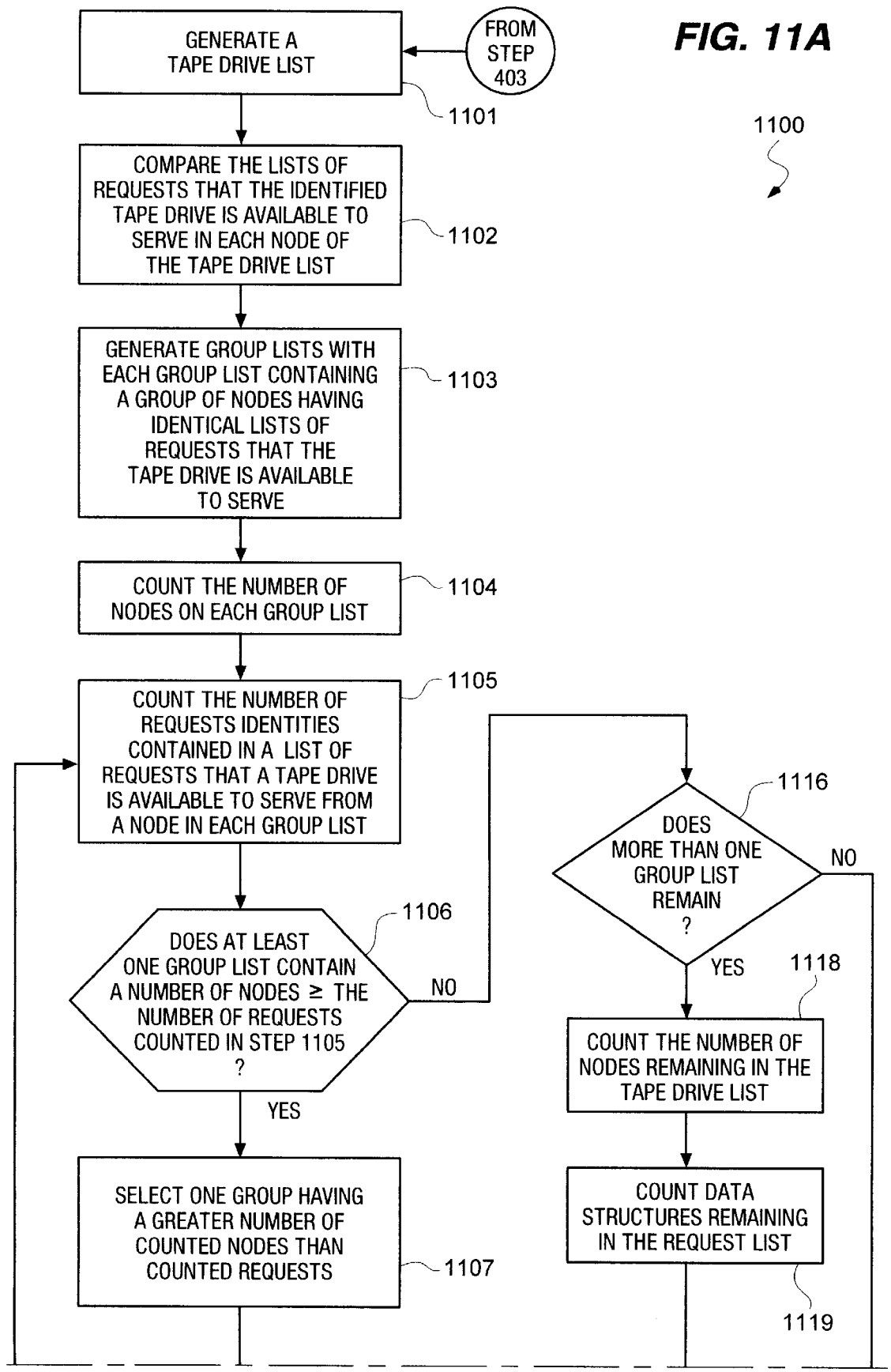
FIGS. 11A–11B illustrates a flow chart of a third preferred embodiment.
Figure 11B:
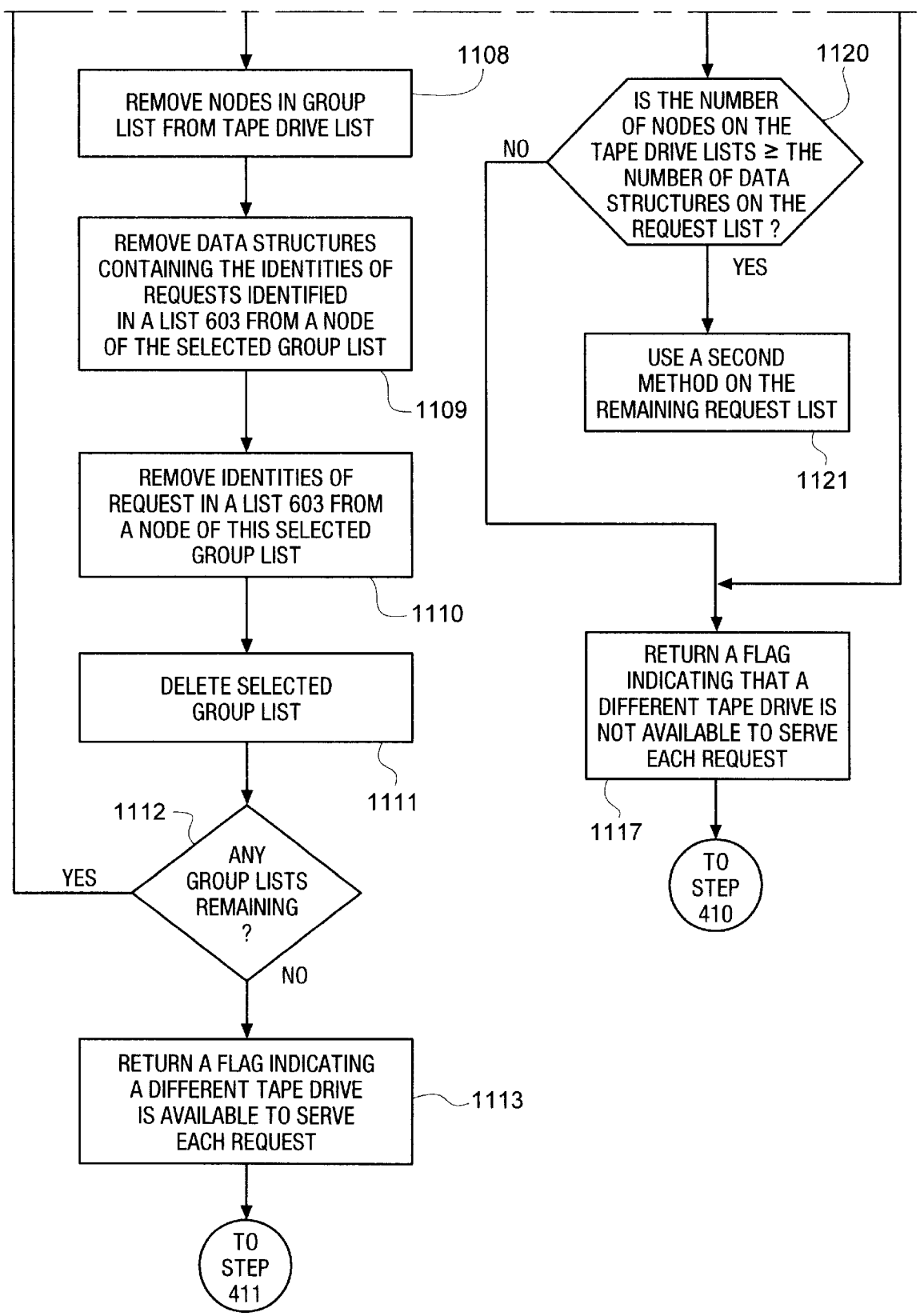

FIG. 11 illustrates a flow chart of a preferred third embodiment of step 404. Process 1100 begins in step 1101 which generates tape drive list 605 identical to the tape drive list generated by process 900. Nodes 600 of the tape drive list 605 have the data structure described above by FIG. 6. To generate the tape drive list, request list 505 is read and each different tape drive identified in list 503 of each data structure 500 is added to tape drive list 605. Request list 505 is read and each request identified in a data structure 500 is placed on the lists 603 of requests of every node 600 that contains an identity of a tape drive that is available to serve the request.

After the tape drive list is generated, step 1102 has microprocessor 200 compare the list 603 of request identities in each node 600 of tape drive list 605. Step 1103 generates group lists with each group list comprising nodes with identical lists 603 of request identities. In step 1104, Microprocessor 200 counts the number of nodes 600 on each group list, which represents the number of tape drives in a group. Step 1105 has microprocessor 200 count the number of request identities contained in a list 603 of request that the tape drive is available to serve from one node 600 in each group list. The counted number of requests represents the number of requests that the group is available to serve. The number of requests and number of nodes for each group list are compared by microprocessor 200 in step 1106 and microprocessor 200 determines does at least one group list have a greater number of counted nodes 600 than counted requests.

If there are no group lists with a greater number of nodes, step 1116 is executed. If at least one group list does have a greater number of counted nodes 600, step 1107 has microprocessor 200 select one group list that has a greater number of counted nodes than counted requests. In step 1108, microprocessor 200 removes the nodes 600 in the selected group list from the tape drive list 605 and from each tape drive identity list 503 in data structures 500 in request list 505. The nodes are removed to indicate the tape drives identified in the node have been used. Step 1109 removes the data structures 500 containing the identities of requests identified in a list 603 in a node 600 of the selected group list from the request list. This indicates that each of the requests identified in the removed nodes 500 will be served by a different tape drive. Step 1110 removes the identities of the requests in the removed data structures from the lists 603 in nodes 600 of tape drive list 605, since these requests are already served by different tape drives. Step 1111 deletes the selected group list. This prevents the selected group list from being used in a subsequent step. Microprocessor 200 determines if there are any group lists remaining in step 1112. If no group lists remain, step 1113 returns a flag indicating that the requests can be served. If at least one group list remains, process 1100 is repeated starting at step 1105.

If microprocessor 200 determines that there are no group lists with a number of tape drives greater than or equal to the number requests that the tape drive are available to serve in step 1106, microprocessor 200 executes step 1116 and determines if more than one group lists remain. If one group list remains, then microprocessor 200 executes step 1117 and returns a flag indicating that a different tape drive is not available to serve each request.

If more than one group remains, microprocessor 200 must determine if another method must be used. Microprocessor 200 counts the number nodes 600 remaining in tape drive list 605 in step 1118. This represents the number of tape drives remaining. The number of data structures 500 remaining on request list 505 is counted in step 1119. This is the number of remaining requests. Step 1120 determines is the number of nodes 600 in tape drive list 605 greater than or equal to the number of data structures 500 in the request list 505. If the number of nodes remaining is greater than the number of data structure remaining, microprocessor 200 must execute another method in step 1121 to determine if each of the remaining requests can be served by a different tape. Another method must be used because there are more remaining tape drives than remaining requests, which means a different remaining tape drive may be available to serve each remaining request. Otherwise, microprocessor 200 executes step 1117 and returns a flag indicating the requests may not be served.

If process 1100 returns the flag of step of step 1117, step 404 illustrated on FIG. 4 goes to step 410 and returns a flag indicating the request queue may cause a failure and modified request queue 300 cannot be used to schedule the write operations. If step 404 reads a flag from step 1113, step 411 returns a flag indicating that the modified lists of tape drives will not cause a failure and modified request queue 300 can be used to schedule the write operations. Otherwise, a second method must be used to determine which flag step 404 returns.

The following example shows how process 1100 is executed. The first table below represents a request list, the second table represents the tape list generated by step 1101, and the third table represents the group lists formed in step 1103.

| Request identification | Tape Drive Available List |
| --- | --- |
| A | 1,2,3,4,5,6,7,8,9 |
| B | 1,2,3,4,5,6,7,8,9 |
| C | 1,2,3,4,5 |
| D | 1,2,3,4,5 |
| E | 6,7,8,9 |
| F | 6,7,8,9 |

| Tape Drive Identification | List of Request that Tape Drive is Available To Serve |
| --- | --- |
| 1 | A,B,C,D |
| 2 | A,B,C,D |
| 3 | A,B,C,D |
| 4 | A,B,C,D |
| 5 | A,B,C,D |
| 6 | A,B,E,F |
| 7 | A,B,E,F |
| 8 | A,B,E,F |
| 9 | A,B,E,F |

| Group List of Tape Drives | Requests Each Group List is Available to Serve |
| --- | --- |
| 1,2,3,4,5 | A,B,C,D |
| 6,7,8,9 | A,B,E,F |

Step 1106 determines there are two groups that have a greater or equal number of tape drives and requests. Microprocessor 200 selects one of the unit group lists in step 1110, for simplicity the first unit group list is selected. Step 1108 and 1109 remove the nodes 600 in the selected group list from tape drive list 605 and the data structures 500 from request list 505. The identities of the requests are removed from the remaining nodes in step 1110.

The selected group list is deleted and one group list remains comprising Tape Drives 6,7,8,9 with a list of requests containing E, F. Step 1112 determines this one group remains and microprocessor 200 repeats process 1100 starting from step 1105. The second time through the process, the second unit group is removed. Microprocessor 200 determines no groups remain in step 1112 and returns a flag that indicates a different tape drive is available to serve each request.

The third embodiment uses the fewest number of steps to reach a determination as to whether or not the requests can be served by different tape drives when a determination is made. Since the tape drives are grouped, the number of determinations needed is less than the total number of tape drives and the number of comparisons needed will be less than the number of tape drives. However, the third embodiment does not always determine whether the requests will be served. In the circumstances, the number of requests and tape drives that must be applied to another method are reduced. The reduction allows other more costly and time-consuming methods of determination to be used without a loss of accuracy.

All three embodiments can be used to test whether the tape drives assigned by the modified tape drive lists will serve the requests without a write failure. Each embodiment makes a more reliable determination then the test that is currently used. The current test of counting of the number of tape drives available and the number of request does not test the relationship of the assignments on the modified lists. The present invention tests the relationships of the assigned tape drives to the requests. This allows the present invention to detect whether the tape drive lists in a modified request queue may cause a request to fail, which the current test does not detect. Although specific embodiments are disclosed herein, it is expected that persons skilled in the art can and will design alternate tape drive allocation methods that are within the scope of the following claims either literally or under the doctrine of equivalents.

What is claimed is:

1. A machine readable storage device, tangibly embodying instructions executable by a memory controller of a memory management subsystem to perform a method of steps for determining whether m tape drives in said memory management subsystem are available to concurrently serve n requests to store data from connected processors, wherein at least one of said n requests must be served by a one of a predetermined m-x tape drives of said m tape drives that have been assigned by said controller to store data from said at least one of n requests, said method comprising the steps of:

grouping said n requests into groups of l different requests wherein l is less than or equal to n;

determining whether l different tape drives of said m tape drives are available to concurrently serve said l different requests in each of said groups, wherein said l different tape drives includes a specified one of said predetermined m-x tape drives for each of said at least one of said n requests that must be served by said predetermined m-x tape drives, and returning a flag responsive to a determination that said n different tape drives are available to serve said n requests.

2. The method of claim 1 wherein:

said grouping step comprises the steps of:
  generating all possible subsets of said n requests from a set including all of said n requests; and said step of determining comprises the steps of:
  counting the number of said n requests in each of said all possible subsets,
  counting the number of different tape drives from said m tape drives available to serve said requests in each of said all possible subsets,
  comparing said number of said n requests and said number of said different tape drives, and
  determining whether said n different tape drives are available to serve said n requests responsive to said number of said different tape drives being greater than or equal to said number of said n requests for each of said all possible subsets.

3. The method of claim 2 wherein said step of grouping further comprises:

reading a modified request queue from a connected memory, wherein said modified request queue includes an identity of each of said n requests and an identity of each said tape drive of said m tape drives available to serve each of said n requests;

generating a request list from said read modified request queue, said request list comprised of n data structures, wherein each of said n data structures includes said identity of one of said n requests and a tape drive identity list of each said identity of each said tape drive of m tape drives available to serve said one of said requests; and wherein said step for generating each said subset comprises the steps of,
  1) removing one data structure from said request list;
  2) generating a new list comprising said removed data structure, wherein said new list represents one subset;
  3) creating each remaining subset of said all possible subsets comprising said one request identified in said removed data structure on said new list and with requests identified in data structures remaining in said request list;
  4) determining whether said request list is empty; and
  5) repeating said steps 1–4 responsive to a determination that said request list is not empty.

4. The method of claim 3 wherein said step of creating each said remaining subset not yet generated comprising said removed node comprises:
  1) determining if said request list is empty;
  2) removing one data structure from said request list responsive to a determination said request list is not empty;
  3) adding said removed one data structure to said new list;
  4) executing said step of creating on said new list from step 3 and said request list of step 2; and
  5) repeating steps 1–4, until a determination that said request list is empty; wherein said removals executed by said step of creating in step 4 do not effect said request list used in the repetition of steps 1–4.

5. The method of claim 4 wherein said step of counting said number of said requests in each said subset comprises the step of:

counting the number of data structures in said new list, wherein each data structure represents one of said n requests.

6. The method of claim 4 wherein said step of counting of said number of said different tape drives available to serve said requests in each said subset comprises the step of:

reading said tape drive identity lists from data structures in said new list; and counting the number of different tape drives identified in said read tape drive identity lists on said data structures in said new list.

7. The method of claim 1 wherein: said grouping step comprises the step of:

grouping said n request in groups of requests that can be serviced by each of said m tape drives; and said step of determining comprises the steps of:
  1) counting the number of requests from said n requests that each of said m tape drives is available to serve;
  2) comparing said counted numbers of said requests that each of said m tape drives is available to serve;
  3) selecting, responsive to said comparing, a minimally used tape drive, wherein said minimally used tape drive is a tape drive having the smallest said number of requests that said tape drive is available to serve;
  4) counting the number of tape drives available to serve each of said n requests that said minimally used tape drive is available to serve;

5) comparing said number of tape drives available to serve each of said n requests that can be served by said minimally used tape drive;

6) selecting, responsive to said comparisons, a minimally served request, wherein said minimally served request is a one of said requests having the smallest said number of tape drives available to serve said request;

7) assigning said minimally served request to said minimally used tape drive;

8) determining whether all of said m tape drives have been assigned;

9) repeating step 1–8 using said m tape drives and said n requests that have not been assigned until a determination that all of said m tape drives have been assigned;

10) determining whether each of said n requests have been assigned to one of said m tape drives; and 11) determining said n different tape drives are available to serve said n requests responsive to a determination that each of said n requests have been assigned to a one of said m drives.

8. The method of claim 7 wherein said step of grouping said n requests by said request that can be service by a tape drive further comprises the steps of:

reading a modified request queue from a connected memory, wherein said request queue includes an identity of each of said n requests and an identity of each said tape drive of said m tape drives available to serve each of said n requests;

generating a request list from said read modified request queue, said request list comprised of n data structures, where each of said n data structures includes said identity of one of said n requests and a tape drive list of each said identity of said tape drives of m tape drives available to serve said one request;

generating a tape drive list comprising m nodes, each of said m nodes comprising an identity of one of said m tape drives and a list of identities of each of said n requests that said one tape drive is available to serve; and wherein said counting of said number of said requests each said tape drive is available to serve comprises:

counting each of said identities of said requests in said list of identities in each said node of said tape drive list.

9. The method of claim 8 wherein said counting of said number of tape drives available to serve each said request comprises the step of:

counting each said identity of said tape drives on said tape drive identity list in each said data structure containing one said identity of a request identified on said list of identities in said node containing said identity of said minimally used tape drive.

10. The method of claim 9 wherein said step of assigning comprises the steps of:

removing said node of said m nodes containing said identity of said minimally used tape drive from said tape drive list;

removing said data structure of said n data structures containing said identity of said minimally served request from said request list;

removing said identity of said minimally used tape drive from said tape drive list in each said data structure remaining on said request list; and removing said identity of said minimally served request from each said list of said identities of said request that said identified tape drive is available to serve in each of said nodes remaining on said tape drive list.

11. The method of claim 10 wherein said step of selecting said minimally used tape drive comprises the steps of:

reading said list of said identities of said n requests that said identified tape drive is available to serve from each node with the smallest said number of requests;

reading each said data structure in said request list containing said identity of a request identified in said list of said identities of requests from said each node;

counting the number of tape drives identified in each said tape drive list identity of each said read data structure;

comparing each said number counted for each said data structure;

selecting said data structure with the smallest said number of said tape drives;

determining each said node containing said list of identities of said requests that contains said request identified on said selected data structure; and selecting said node with said list of identities of said requests containing said identity of said request in said selected data structure as said minimally used tape drive.

12. The method of claim 11 wherein said selecting of said node further comprises the steps of:

selecting said minimally used tape drive randomly responsive to more than one of said nodes containing a list of said identities of said requests with said identity of said request on said selected data structure.

13. The method of claim 1 wherein:

said step of grouping comprises the step of:

generating groups of requests wherein each of said groups contains each of said n requests that a particular one of said m tape drive is available to serve; and said step of determining comprises the steps of:

comparing each of said groups of requests of said n requests that each of said particular ones of said m tape drives is available to serve to one another;

generating tape drive groups of said particular ones of said m tape drives having an identical said group of requests that said tape drives are available to serve;

counting the number of said tape drives in each of said tape drive groups;

counting the number of said n requests that said tape drives in each of said tape drive groups are available to serve;

comparing said counted number of tape drives and said counted number of requests;

determining whether each of said tape drive groups has said counted number of tape drives that is greater than or equal to said counted numbers of requests; and determining, responsive to a determination that each said grouping has said number of counted tape drives greater than or equal to said counted number of requests, that said n different tape drives are available to serve said n requests.

14. The method of claim 13 wherein:

said step of grouping further comprising the steps of:

reading a modified request queue from a connected memory, wherein said modified request queue includes an identity of each of said n requests and an identity of each said tape drive of said m tape drives available to serve each of said n requests, generating a request list from said read modified request queue, wherein said request list is comprised of n data structures, and wherein each of said n data structures includes said identity one of said n requests and a tape drive list of each said identity of said tape drives of m tape drives available to serve said one request, and generating a tape drive list from said request list comprising m nodes, each of said m nodes comprising an identity of one of said m tape drives and a list of identities of requests that said one tape drive is available to serve; and wherein said step of determining further comprises the steps of:

comparing said list of identities of said requests that said identified tape drive is available to serve in each said node of said tape drive list.

15. The method of claim 14 wherein said step of generating said groups of said tape drives comprises the step of:

generating each of a plurality of group lists for each said tape drive group of said nodes containing identical lists of said identities.

16. The method of claim 14 wherein the step of counting said tape drives comprises:

counting each node in each of said plurality of group lists, wherein the number of nodes represents the number of tape drives in said tape drive group.

17. The method of claim 14 wherein the step of counting said request that said tape drive group is available to serve comprises the step of:

reading one said list of identities of said requests that said identified tape drive is available to serve on one node in said group list; and counting said requests identified on said read list of identities.

18. The method of claim 14 wherein said determining whether all said tape drive groups have a counted number of said tape drive greater than or equal to said counter number of requests comprises:

1) counting said nodes in each said group list, representing said number of said tape drives in each of said tape drive groups;

2) reading one said list of identities of said requests that said identified tape drive is available to serve in one node of said group list; and 3) counting said requests identified in said read list of identities;

4) comparing said counted number of said nodes and said counted numbers of said requests;

5) determining from said comparison if at least one of said group lists has a counted number of said nodes that is greater than or equal to said counted number of requests;

6) selecting one of said at least one group lists responsive to a determination that said at least one group list has a counted number of said nodes that is greater than or equal to said counted number of said requests;

7) removing each node on said selected group list from said tape drive list;

8) removing each data structure containing said identity of a request identified on one of said list of said identities of said request of said group list from said request list;

9) removing each said identity of a request on said list of said identities of requests from other said list of identities of requests in all remaining nodes;

10) deleting said selected group list;

11) determining that at least one said group list remains;

12) repeating said steps 1–11 responsive to a determination that said at list one said group list remains.

19. The method of claim 18 wherein said step of determining whether all said tape drive groups have a counted number of said tape drive greater than or equal to said counter number of requests further comprises:

determining responsive to a determination that none of said remaining group lists have a counted number of said nodes that is greater than or equal to said number of requests, whether at least two group lists remain;

counting the number of remaining nodes on said tape drive list responsive to said determination that said at least two unit groups remain;

counting the number of remaining data structures on said request list responsive to said determination that said at least two unit groups remain;

comparing said counted numbers; and determining responsive to said number of said nodes being greater than or equal to said number of said data structures that a second method of determining must be used.

* * * * *